No. 731,839.

Patented June 23, 1903.

UNITED STATES PATENT OFFICE.

GUSTAVUS A. BAHN, OF AUSTIN, TEXAS.

SULFURIC-ACID PROCESS OF EXTRACTING PRECIOUS METALS FROM SOLUTIONS.

SPECIFICATION forming part of Letters Patent No. 731,839, dated June 23, 1903.

Application filed November 4, 1902. Serial No. 130,108. (No specimens.)

*To all whom it may concern:*

Be it known that I, GUSTAVUS A. BAHN, a citizen of the United States, residing at Austin, in the county of Travis and State of Texas, have invented certain new and useful Improvements in Processes of Recovering Precious Metals from Their Solutions, and which I designate as the "Sulfuric-Acid Process;" and I do hereby declare that the following is a full, clear, and exact description of the invention, which will enable others skilled in the art to which it appertains to use the same.

Heretofore the precious metals, such as gold or gold and silver, have been recovered from their aqueous cyanid solutions by passing the cyanid solutions containing the precious metals through zinc-sponge, zinc-shavings, zinc-granules, agitating with zinc-dust, by zinc-fumes or zinc-vapors, or by the use of electricity and like means.

The object of my invention is to separate the precious metals from their cyanid solutions in a rapid and thorough manner and to recover the precious metals from solutions thereof.

To carry my invention into effect, I add a quantity of sulfuric acid to the cyanid solutions containing the precious metals, the quantity of sulfuric acid varying in volume, compared with the cyanid solution to be operated on, according to the amount of cyanid that has been used in making the solution. Where a greater amount of cyanid has been used in a given quantity of water, a greater volume of sulfuric acid will be required than where a smaller amount of cyanid has been used in the same quantity of water to form the cyanid solution containing the precious metals. I may add the cyanid solutions containing the precious metals to the sulfuric acid, or I may add the sulfuric acid to the cyanid solution containing the precious metals. The quantity of sulfuric acid necessary to properly acidulate the cyanid solution containing the precious metals will vary from less than one per cent. to three per cent. of the cyanid solution to be operated on, according to the amount of cyanid that has been used in making the solution. Thus where a greater amount of cyanid has been used more sulfuric acid will be required than where a less amount of cyanid has been used in making the same quantity of solution to dissolve the precious metals. In measuring the sulfuric acid I am speaking of it as being measured volumetrically. Thus one per cent. would mean one part, by measure, of sulfuric acid to one hundred parts, by measure, of cyanid solution. Two per cent. would mean two parts, by measure, of sulfuric acid to one hundred parts, by measure, of the cyanid solution to be operated on. Three per cent. would mean three parts, by measure, of sulfuric acid to one hundred parts, by measure, of the cyanid solution to be operated on. A larger quantity of sulfuric acid could be used, but would be less economical. The cyanid solutions containing the precious metals being acidulated with a sufficient quantity of sulfuric acid, I immerse therein a sheet of zinc, although zinc in other form may also be used. Particles of the precious precipitate adhering to the zinc may be brushed off and the zinc repeatedly used in other acidulated cyanid solutions so long as any of the zinc remains. Chemical action takes place immediately the zinc is immersed in the properly-acidulated cyanid solution containing the precious metals, a part of the zinc being dissolved during the operation and taking the place of the precipitated precious metals. The precious precipitate may now be recovered by means of filtering and melted or disposed of by other known process. The cyanid solution exhausted of its precious metals may be regenerated, the zinc recovered, and the cyanid solution again used.

Having fully described my invention, what I claim, and desire to secure by Letters Patent, is—

1. The process herein described of precipitating precious metals from solutions thereof, which consists in producing cyanid solutions of said precious metals, then acidulating with sulfuric acid said cyanid solutions, then immersing zinc in sheet, plate, or other form, in the acidulated cyanid solution containing the precious metals, substantially as set forth.

2. The process herein described of precipitating precious metals from solutions thereof, which consists in producing cyanid solutions of said precious metals, then acidulating with sulfuric acid, said cyanid solutions, then immersing zinc in sheet, plate, or other form in the acidulated cyanid solution containing the precious metals; the chemical action thereupon taking place in the solution, dissolving zinc and precipitating the precious metals; then recovering from the precipitate of the preceding operation, the precious metals, by filtering and melting, or other process, substantially as set forth.

In testimony whereof I affix my signature, in the presence of two witnesses, this 16th day of October, 1902.

G. A. BAHN.

Witnesses:
A. E. STEEFOX,
O. MANFORT.